United States Patent [19]

Douglas

[11] 4,013,832
[45] Mar. 22, 1977

[54] SOLID STATE IMAGE MODULATOR
[75] Inventor: Graham M. Douglas, Monrovia, Calif.
[73] Assignee: McDonnell Douglas Corporation, Long Beach, Calif.
[22] Filed: July 28, 1975
[21] Appl. No.: 599,899
[52] U.S. Cl. .............................. 358/212; 250/211 J; 315/169 TV
[51] Int. Cl.² ...................... H04N 5/30; H04N 3/14
[58] Field of Search .......... 178/7.1, 7.83, DIG. 40, 178/DIG. 36, DIG. 37, DIG. 33, DIG. 39; 250/211 R, 211 J, 578; 315/169 R, 169 TV

[56] References Cited
UNITED STATES PATENTS

| | | | |
|---|---|---|---|
| 3,120,578 | 2/1964 | Potter et al. | 178/DIG. 37 |
| 3,728,481 | 4/1973 | Froelich et al. | 178/DIG. 39 |
| 3,800,078 | 3/1974 | Cochran et al. | 178/7.1 |
| 3,800,079 | 3/1974 | McNeil et al. | 178/7.1 |
| 3,830,972 | 8/1974 | Siverling et al. | 178/7.1 |
| 3,908,077 | 9/1975 | Stut et al. | 178/DIG. 36 |
| 3,919,473 | 11/1975 | Cotter | 178/DIG. 39 |

Primary Examiner—Robert L. Richardson
Attorney, Agent, or Firm—Kleinberg, Morganstern, Scholnick & Mann

[57] ABSTRACT

For use with a one- or two-dimensional charge-coupled photodiode array, apparatus for modulating an optical image formed on the photosensor portion of the array with a predetermined pattern of density variations and for causing the pattern to move in a predetermined manner with respect to the image.

8 Claims, 10 Drawing Figures

SOLID STATE IMAGE MODULATOR

BACKGROUND OF THE INVENTION

1. Field of the Invention

This invention relates to image processing and, more particularly, to apparatus for superimposing by electrical means a movable "pattern" on an optical image detected by a charge coupled photodiode array.

Such an apparatus has application to systems for stabilizing optical images and for extracting information for use in tracking various moving objects, including information regarding the presence, the position, and the velocity of objects.

2. Description of the Prior Art

Considerable prior art exists in the field of image processing. The prior art may conveniently be divided into categories such as spatial filtering, image position measurement, and image velocity sensing.

Spatial filtering may be used when it is feasible to distinguish images of different sizes from one another. For example, a spatial filter consisting of a series of opaque grids could be used as a high pass optical filter, to average out large images while passing small images having higher spatial frequencies. Spatial filters are used in a variety of instruments including the position and velocity sensors described below.

U.S. Pat. No. 2,941,080, issued June 14, 1960 to S. Hansen shows apparatus used for determining the position of an image in a field of view. In that invention, the image of a star or other object of small angular extent is chopped by a reticle pattern consisting of two sets of grids having different spatial frequencies. Each grid pattern is interrupted at intervals to generate a succession of bursts of high frequency pulses. The phase of the bursts of pulses is related to the image position, and the frequency of the pulses within the burst facilitates the use of tuned electronic filters in alternating current signal processing circuits.

The use of two superimposed grid patterns having different spatial frequencies results in two distinct sets of pulse repetition frequencies within the burst of pulses that are generated. These two carrier frequencies, associated with the X and Y directions in the field of view, permit narrow band electrical filtering to separate the position coordinates in the two dimensions, simultaneously.

The reticle in Hansen was rotated through a gear train driven by an electric motor, and a reference signal was generated by a potentiometer or other sensor geared to the driving mechanism. A single photodetector converted the light from the chopped image into an electrical signal.

In U.S. Pat. No. 3,500,050 issued Mar. 10, 1970, to Hillman, and assigned to the assignee of the present invention, an image is focused on a portion of a spoked reticle and simultaneously, light from a non-moving source, for example a light-emitting diode, it also focused on the reticle. Separate photodetectors detect the chopped light from these sources.

If the image is moving in the direction of the spokes of the chopper, the doppler effect causes a reduction in the chopping frequency. This reduction in frequency may be used as a basis for determining the velocity of the image in the direction of the spokes of the reticle. From a mechanical standpoint this type of image motion sensor does not differ greatly from the image position sensor of Hansen described above. A reticle having alternate opaque and transparent spokes is rotated in the image plane by an electric motor and possibly a gear train.

Electro-optical instruments in which a reticle physically moved in the image plane are generally thought of as precision instruments. The reticle is mounted accurately with its axis of rotation truly perpendicular to the plane of the image. Care is taken to assure that the geometric center of the reticle lies on its axis of rotation. Also, the reticle and the apparatus used to rotate it may be carefully balanced both statically and dynamically, to reduce mechanical vibrations to an insignificant level.

In the present invention, the moving reticle is generated electronically and the advantages of the prior art precision instruments are attained but without the need for moving parts.

SUMMARY OF THE INVENTION

As a result of the improved solid state technology developed within the last decade, it has become practical to fabricate arrays of charge-coupled photodiodes. The array, which is formed of individual detector cell elements, can be formed in either a linear configuration or a two-dimensional configuration. Each of the individual detector cells will generate and accumulate, when exposed to light, an electrical charge across its terminals.

The theory and functioning of one- and two-dimensional arrays of charge-coupled photosensors as contemplated herein are described in the article "Charge-coupled Devices" in the Scientific American of February 1974, pages 22–31.

After prolonged exposure to light, the charge reaches a limiting or saturation value which represents one of the design parameters of the device. The electrical charge developed in each individual detector cell may be read out by suitable electronic means to yield a signal bearing a predetermined relationship to the integrated light exposure. If the illumination is extremely bright, the exposure time must be reduced to prevent saturation of the cell.

A linear charge-coupled diode array as contemplated herein consists of a photosensor array of accumulating the photocharge plus an associated charge-coupled shift register with one charge-coupled element for each photosensor element. The shift register is actuated by clock pulses to move the "packets" of accumulated charge to an output point. At predetermined intervals a transfer signal is applied to the array causing the charges accumulated by the photosensitive elements to be transferred in parallel into the charge-coupled shift register.

Following this transfer, signals are applied to return the photosensors to their normal charge-accumulating condition. While the photosensitive elements are again being charged, the charge packets previously dumped into the shift register are clocked out to form a sequential video signal.

Depending on the format desired for the video signal, the charge packets clocked out of the shift register may be used or transmitted at the times they are clocked out, or a buffer shift register or other memory device may be used in conjunction with an independently clocked input multiplexer and output demultiplexer to permit some other desired format to be achieved. It makes no difference to the concept of the present invention whether this format-adjusting stage is applied before or after the predetermined pattern of density variations is imposed on the data comprising the image. Because the format-adjusting step is not a part of the present invention, it will be assumed herein for convenience of exposition that the format-adjusting stage follows the pattern imposing stage.

In a two-dimensional charge-coupled diode photosensitive array, light falls on the individual photosensor elements, causing them to generate and accumulate packets of charge. The packets are, again, transferred, in parallel, a row at a time, into a shift register.

Next, the shift register is stepped out, and when the charge packets from each row of the array have been stepped out, the scan is complete. Thus, the output consists of a predetermined sequence of signals representing the amounts of charge accumulated in the individual photosensor sites corresponding to the impinging radiation. The several rows are read out in succession until the entire array has been scanned.

The present invention avoids the use of moving mechanical elements by providing an array of charge-coupled photodiodes at predetermined locations in the image plane. These diodes can be gated electrically to obtain the same effect as though the image had been chopped by mechanical means. Various patterns can be generated electrically and applied to the array, permitting the pattern to be altered during operation of the image sensor. This, in turn, permits the image sensor to be used for a number of functions, such as sensing both the position as well as the velocity and the angular extent of the image. Alternatively, an adaptive pattern-changing technique may be used to permit the sensor to optimize its pattern under varying conditions.

Thus, it is an object of the present invention to provide a solid state, no moving parts chopper for use in image sensors.

Because the spatial pattern is generated and controlled electrically, it is possible to alter the pattern during operation of the sensor. Different patterns adapted to various uses, such as for sensing position, or for sensing image velocity, can be switched at will during operation of the sensor to provide a multi-purpose or multi-mode sensor. Alternatively, the parameters of a particle pattern can be altered electrically during operation of the sensor to adaptively optimize the pattern relative to the image being sensed.

Because the sensitivity of individual diodes can be adjusted, it is possible to compensate for the fall-off of illumination which generally occurs at the edges of the field of view in most optical systems. Furthermore, because the exposure time of the detectors can be adjusted electrically, it is possible to build into a sensor system electrical means for limiting the output signal automatically in response to the brightness of the field of view or image, rather than by using the more conventional means of interposing neutral density filters or aperture stops in the light path.

In a conventional mechanical chopper designed to provide space-filtering as well as temporal modulation, the reticle is usually located in the image plane, necessitating the positioning of the detector array farther back along the optical axis. In some applications it is not necessary to re-focus the light from the image because the detector is large enough or the detectors can be spaced far enough apart that essentially all of the light falls on the detector. If such is not the case, then it is necessary to provide additional optical elements to re-focus the light from the image plane onto a selected detector. This additional optical stage is not required when electrically scanned detector arrays are used, because the image is always formed directly on the detector array.

The present invention permits simulation of mechanical reticles having regions of different optical density. Optical density is the logarithm of the reciprocal of transmittance, and transmittance is the ratio of the radiant energy transmitted through the reticle to that incident on it at some point.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
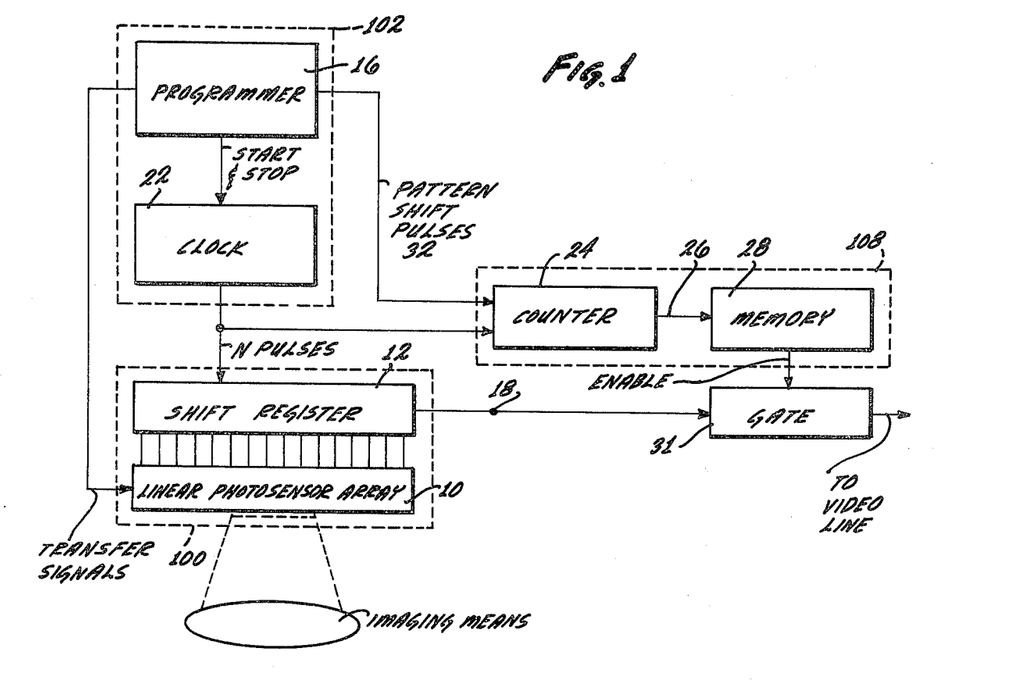
FIG. 1 is a block diagram of one embodiment of the present invention for a one-dimensional photosensor array.

FIG. 1 shows apparatus for generating a moving pattern of active and inactive areas on a linear photosensor array 10. Light falling on the linear photosensor array 10 generates an electric charge which is accumulated in the semi-conductive material directly beneath each of the photosensor elements. The charge packets accumulated in each element are transferred, in parallel, to a shift register 12, which is associated with the array 10, in response to transfer signals generated by programmer 16.

To each element of the array 10 there corresponds an element of the shift register 12. After the packets of accumulated charge have been transferred to the shift register 12, the array 10 is returned to the charge accumulating mode by further transfer signals from programmer 16. Thus, at the end of each accumulation period, the charge packets are transferred to the associated shift register 12 and another accumulation interval is begun.

During the second accumulation interval, the contents of shift register 12 are presented in serial form at terminal 18 of the shift register 12. Readout is accomplished by a succession of clock pulses generated by clock 22 and used to actuate the shift register 12. There must be one clock pulse for each photosensor element. In general, the output of clock 22 is a series of bursts of pulses, the timing of the bursts being determined by a programmer 16. These clock pulses are then counted by counter 24 whose output constitutes the address of a binary digit stored in non-destructive memory 28. Counter 24 counts from 1 to N, and the $(N + 1)$st pulse received recycles counter 24 to the 1 state.

Memory 28 contains a series of N 1's and 0's, stored at addresses corresponding to the successive readings of counter 24. The 1's correspond to active areas on the photosensor array 10 while the 0's correspond to inactive areas. If, at any instant, the output of memory 28 is a 1, the corresponding detector element output presented at terminal 18 is read through gate 31 to the video output line. On the other hand, if the output of memory 28 is a 0, the output of shift register 12 presented at terminal 18 will be inhibited from reaching the video output line. Counter 24 and memory 28 may be considered one form of memory means 108.

To this point, it has been seen how a pattern of active and inactive areas can be made to appear to be present in a linear photosensor array. It remains to be shown how this pattern can be caused to "move" across the array. This is accomplished by feeding an additional, pattern shift pulse on line 32 into counter 24 after the first N pulses have been presented to counter 24. This pattern shift pulse is generated by programmer 16 at the end of each read-out of shift register 12. Thus, on the second read-out, counter 24 and memory 28 now associate the second rather than the first stored binary digit with the first position of the shift register 12. In this way the pattern is shifted relative to the array.

Figure 2:
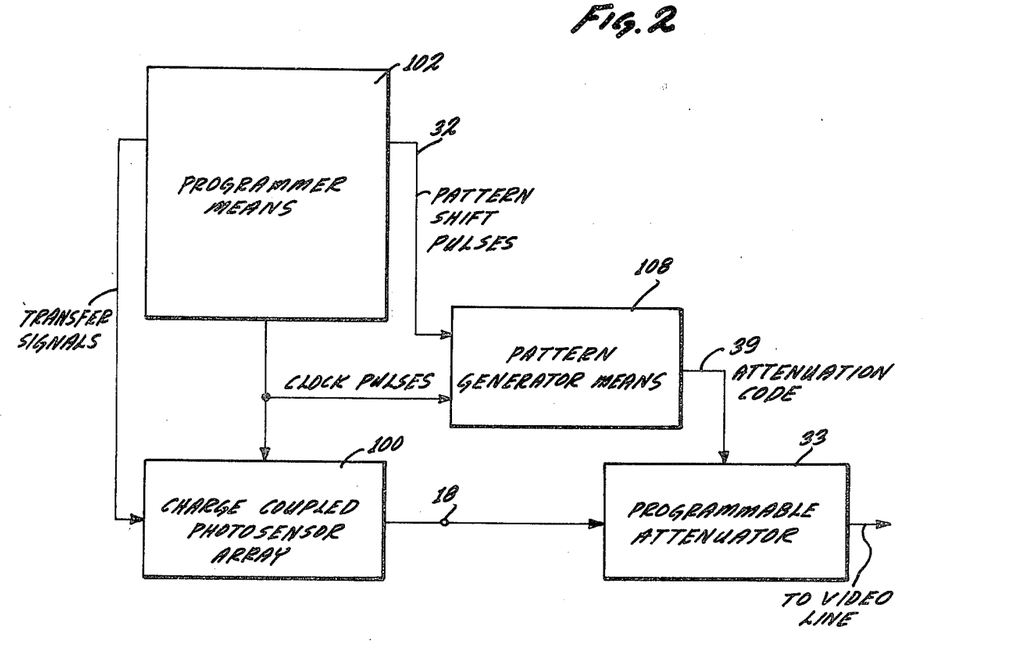
FIG. 2 is a block diagram of a preferred embodiment of the present invention for a one-dimensional photosensor array.

If it is desired to produce a pattern including shades of grey, such as would be produced by a reticle of varying transmittance, it is possible to store in memory 28 a sequence of numbers representing those shades of grey, and to replace gate 31 by a programmable attenuator 33, as shown in FIG. 2. Such a programmable attenuator 33 would permit an attenuation of from 0 to 100% to be applied to the output at terminal 18 of shift register 12 in response to the attentuation code output at 39 from memory 28. The word "gate" as used to identify element 31 of FIG. 1 and as used elsewhere in this application is intended to include a type of programmable attenuator in which the available attentuations are either zero or 100 percent. The attenuated output of shift register 12 would be applied to the video line. The programmable attenuator 33 could be implemented as a demultiplexer selectively connecting the signal at terminal 18 of shift register 12 to various resistors which in turn are each connected to the video line.

Figure 3:
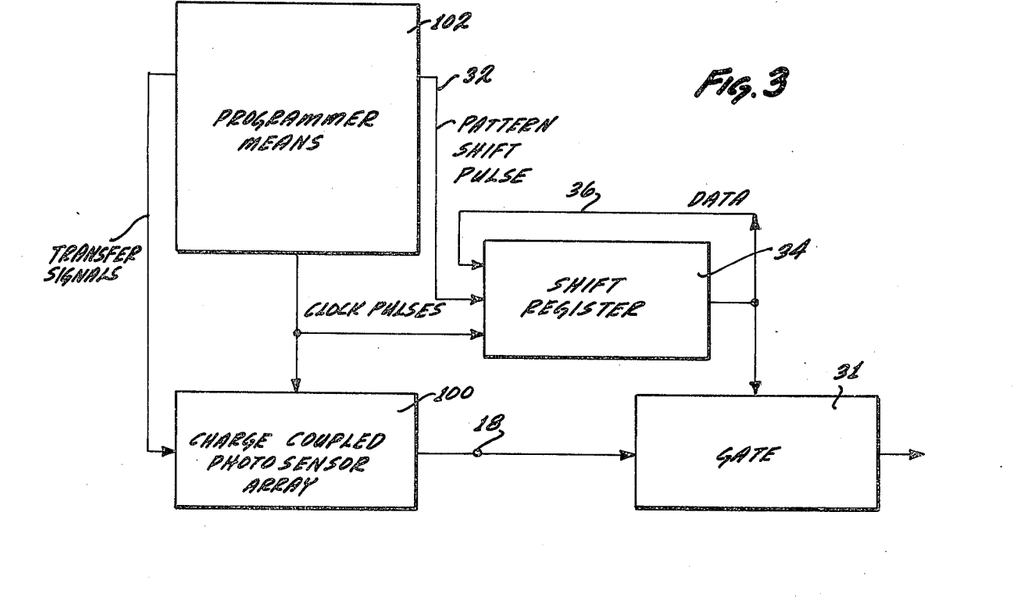
FIG. 3 is a block diagram of an alternative embodiment of the present invention for a one-dimensional photosensor array.

FIG. 3 shows how a moving pattern can be superimposed on a linear array by the use of a shift register implementation. The technique shown in FIG. 3 is similar to that shown in FIG. 1; the only difference is the means used to implement the technique. In FIG. 3 the desired pattern is initially read into a shift register 34. The pattern stored in shift register 34 is recirculated by feedback loop 36, showing that a cyclical sequence is maintained and the shift register is always filled to capacity. Shift register 34 is activated by each of the group of N pulses generated by clock 22 during the read-out phase. Thus, the output of shift register 34 is entirely comparable with the output of read-only memory 28 of FIG. 1 or the output of pattern generator means 108 of FIG. 2 and is used in a similar manner. Although shift registers are sometimes thought of in association with binary data, charge-coupled shift registers, such as 12 of FIG. 1 are capable of operating with analog data, thereby permitting the use of patterns comprised of shades of grey. The pattern is caused to shift relative to the linear array by a pattern shift pulse on line 32 generated by programmer 16 at the completion of each read-out phase.

Figure 4:
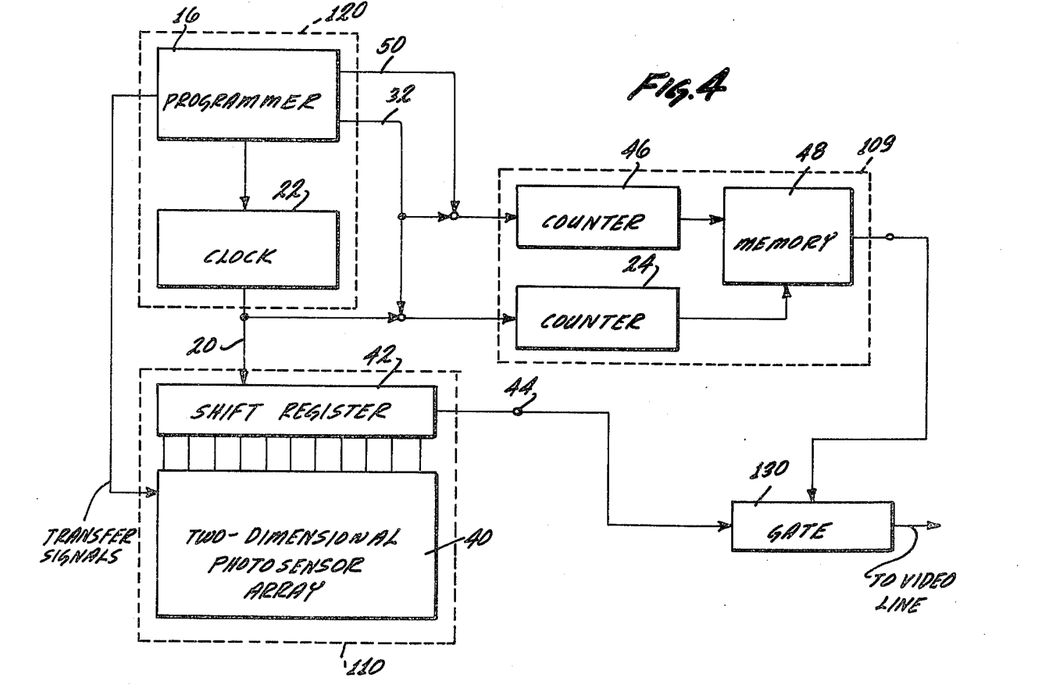
FIG. 4 is a block diagram of one embodiment of the present invention for a two-dimensional photosensor array.

In FIG. 4, there is shown an arrangement for producing a two-dimensional shifting pattern for use with a two-dimensional photosensor array 40. It is assumed that rows of area photosensor array 40 are successively read in parallel into shift register 42. Successive charge packets in these rows, transferred to shift register 42 are read out and presented at terminal 44 in response to N successive clock pulses generated by clock 22 and initiated by programmer 16. The same clock pulses, including one clock pulse for each detector element in a row of the array 40 are fed to counter 24.

Programmer 16 also generates on separate lines and at appropriate predetermined intervals a shifting pulse at 50 each time a line of the array has been stepped out and a pulse at 32 each time a complete frame has been stepped out. The shifting pulse on 32 is applied to counter 24 in addition to the stepping pulses on 20. The shifting pulses on both 32 and 50 are applied as inputs to counter 46. The outputs of recycling counters 24 and 46 are the coordinates of the two-dimensional address used to enter non-destructive memory 48. These coordinates permit a definite memory element to be addressed, at which is stored a known element of the predetermined pattern being generated.

If that element of the pattern is either opaque or transparent, the memory element may contain a "1" or a "0" which is used to enable or disable gate 30, thereby selectively permitting the output of shift register 42 to pass to the video line, as shown in FIG. 4.

Figure 5:
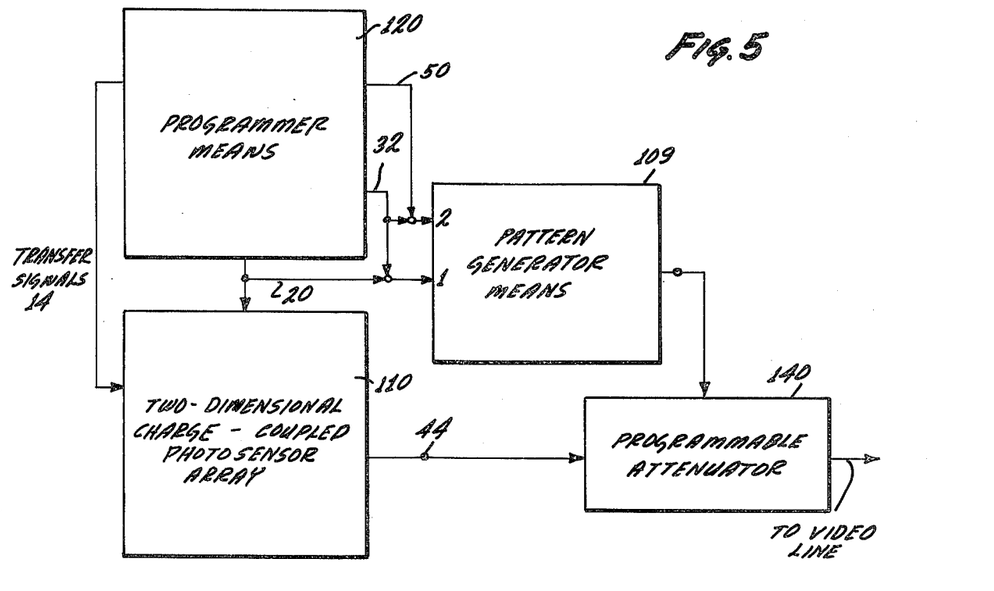
FIG. 5 is a preferred embodiment of the present invention for a two-dimensional photosensor array.

If the element of the pattern is to include shades of grey, a code associated with a particular shade of grey must be stored at the element of non-destructive memory 48 addressed by counters 46 and 24. This code can then be used to control a programmable attenuator as shown in FIG. 5. The programmable attentuator 140 attenuates by predetermined amounts the outputs of the photosensor array presented at terminal 44.

With the arrangement shown in FIG. 4, the pattern will advance one element in both dimensions, from one frame to the next. The pattern can be stopped by withholding pulses on 32 from counters 46 and 24. Alternatively, the pattern can be stopped in one dimension by withholding pulses on 32 from the counter associated with that dimension.

As a more general embodiment, if each pulse on 32 is replaced by N pulses to counter 24 and M pulses to counter 46, the pattern will remain stationary, where the photosensor array comprises N elements in a first dimension and M elements in a second dimension. Then the pattern can be made to progress or retrogress in the first dimension by applying $N + 1$ or $N - 1$ pulses respectively to counter 24, or to progress or retrogress in the second dimension by applying M + 1 or M − 1 pulses respectively to counter 46.

Figure 6:
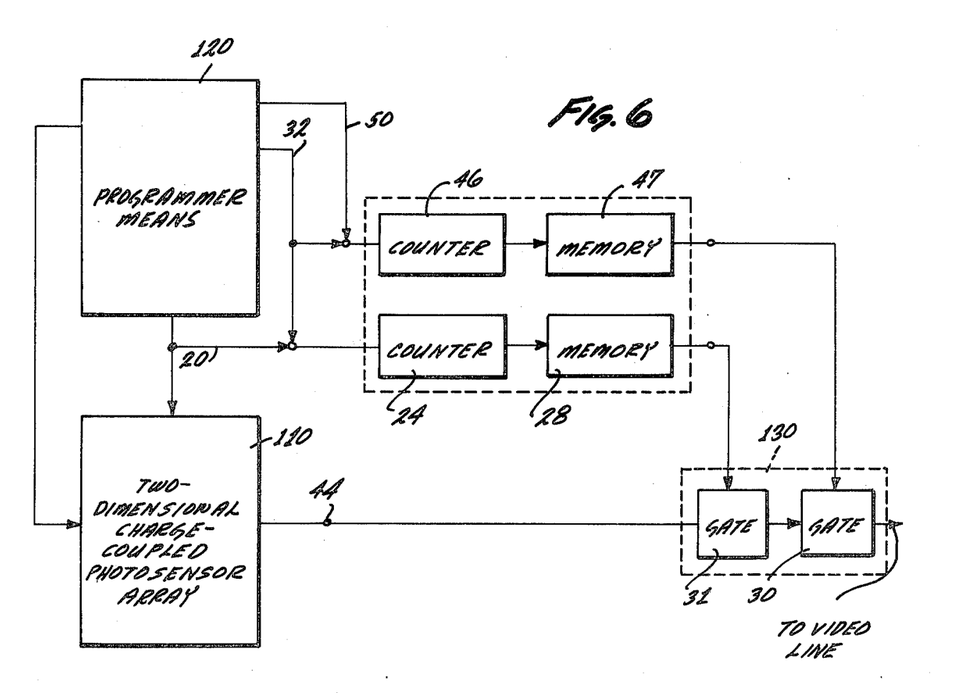
FIG. 6 is an embodiment of the present invention for superimposing independent patterns in each of the two dimensions.
Figure 7:
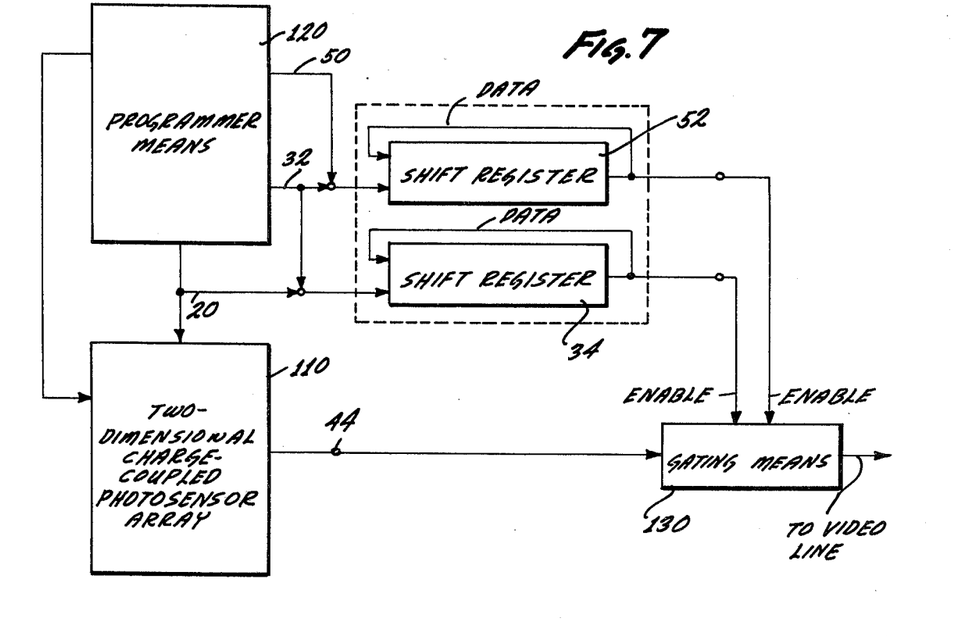
FIG. 7 is another alternative embodiment of the present invention for superimposing independent patterns in each of two dimensions.

In many applications it may be sufficient if the two-dimensional pattern F (x,y) is restricted to a superposition of an x pattern and a y pattern, i.e., $F(x,y) = g(x) h(y)$. In this case, the single read-only memory 48 having N × M elements could be replaced by two separate memories having N elements and M elements respectively, shown as 28 and 47 in FIG. 6. If the pattern consists of 1's and 0's only, the use of two gates in series as shown at 30 and 31 in FIG. 6 would suffice. Alternatively, the outputs of memories 47 and 28 could be used as inputs to an AND gate whose output enables a single gate. Another embodiment possible with a pattern F (x,y) consisting of an x pattern $g(x)$ superposed on a y pattern $h(y)$, is the use of two recirculating shift registers as shown in FIG. 7. If the pattern includes shades of grey, it would be obvious to replace the AND gates of FIG. 6 with programmable attenuators of the type described in connection with FIG. 2.

Figure 10:
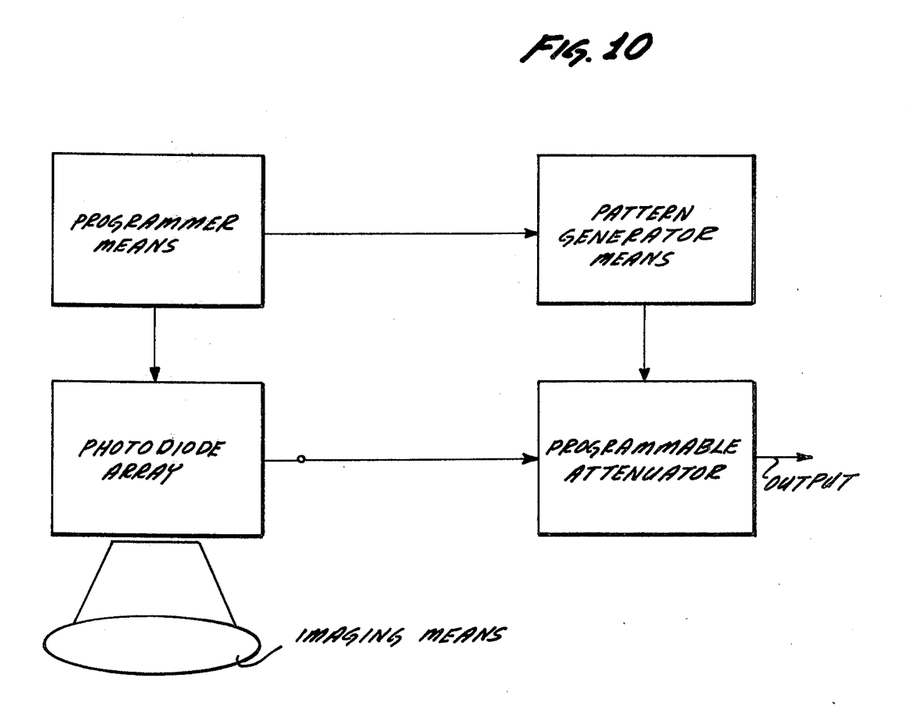
FIG. 10 is a generalized block diagram.

In summary, each embodiment shown for use with a one-dimensional charge-coupled photodiode array 100, comprises a programmer means 102, a pattern generator means 108, and gating means 31 or programmable attenuator 33. Each embodiment shown for use with a two-dimensional charge-coupled photodiode array 110 comprises a programmer means 120, pattern generator means 109, and either gating means 130 or programmable attenuator 140. FIG. 10 shows a generalized block diagram, applicable to all of the above-described embodiments.

Figure 8:
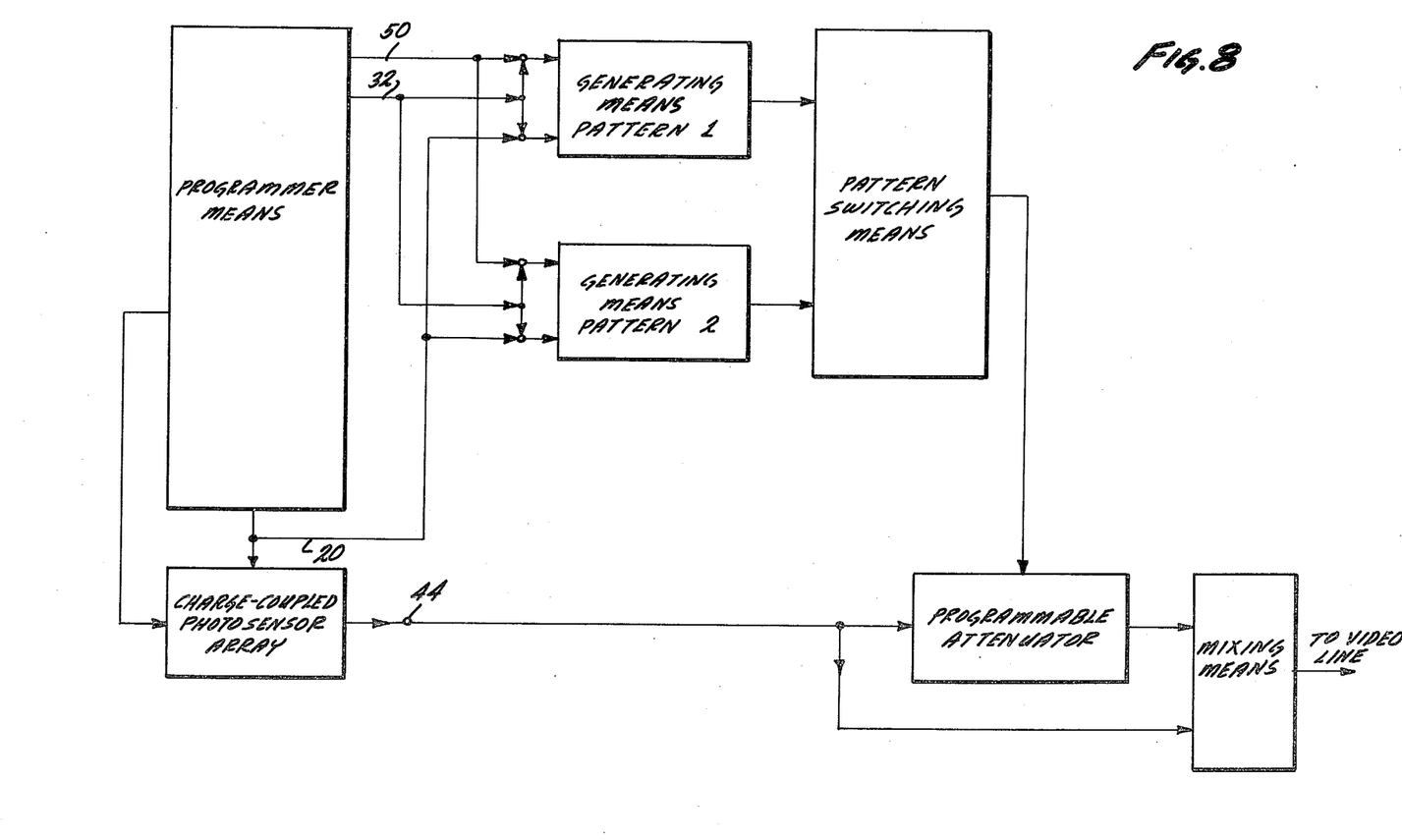
FIG. 8 is a block diagram illustrating a technique for switching patterns and altering the density of the patterns.

The systems described above provide a measure of versatility with respect to altering the patterns. Instead of a single pattern generator means such as 108 of FIG. 2 or 109 of FIG. 5 a plurality of such pattern generators may be provided and a desired pattern may be selected by selection of the corresponding pattern generator, as shown in FIG. 8. Obviously this can be embodied in a single larger memory with a pattern selection code used as part of the address.

Figure 9:
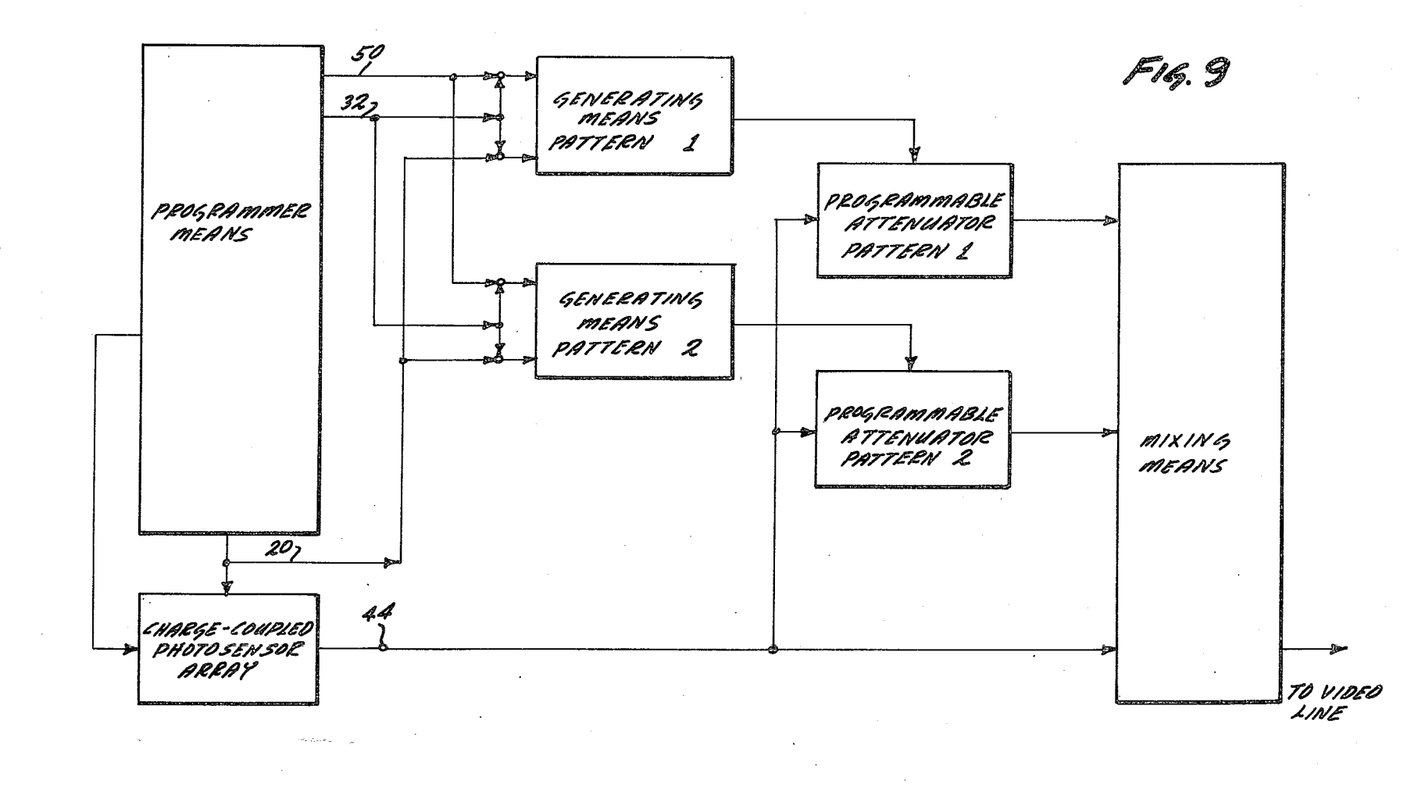
FIG. 9 is a block diagram illustrating a technique for superimposing patterns and controlling their densities.

FIG. 8 also shows the possibility of mixing in controllable proportions the pattern-modulated signal with the unmodulated signal, to provide a means of continuously altering the density of the patterns. FIG. 9 shows the possibility of providing a separate programmable attenuator for each pattern generator means and mixing in controllable proportions the outputs of the programmable attenuators.

The speed with which the pattern appears to move across the photosensor array is directly related to the repetition frequency with which shift register 12 of FIG. 1 or shift register 42 of FIG. 4 is read. Within limits, this is adjustable.

Although it is not possible to simulate precisely the continuous motion of a mechanical reticle, such motion can be approximated with considerable precision. The individual elements in the detector array are discrete and the entire element rather than some part of it must be gated as a unit. Obviously, a much better approximation can be obtained if the shape of the detector elements bears some relation to the type of reticle being simulated. For example, if a spoked reticle is being simulated, it may be convenient to have the individual detector cells bounded by two circles and two radial lines.

It can readily be appreciated that the technique of the present invention for simulating the spatial filtering and temporal modulating action of a mechanical chopper can be applied in a number of different systems. These include systems for determining the position of the image within the field of view as well as systems for determining the X and Y velocity components of objects within the field of view.

Although the preferred embodiment contemplates use of charge-coupled photodiode arrays in which the individual elements are clocked out serially, the basic concept of the invention can be used with photosensor arrays whose elements are read out in parallel. The generalized block diagram of FIG. 10 applies in such case, it being obvious that the programmable attenuator is then a multi-channel device and that the outputs of the photodiode array and the programmable attenuator are both multi-channel. Further, the generalized block diagram of FIG. 10 is applicable regardless of whether the elements of the array are adjacent or are widely spaced, and regardless of whether the array is one-dimensional or two-dimensional.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. For use with an array of N photosensors which produce output signals in response to radiant energy incident on them, apparatus for electrically producing the same effect as if the pattern of radiant energy incident on the photosensors were modulated by placing a given alterable or movable pattern of spatially-varying transmittance in the path of the radiant energy incident on the photosensors, said apparatus comprising:
   signal attenuating means coupled to each photosensor for attenuating the output signals of the photosensors according to a given pattern which is referenced to the relative locations of the photosensors within the array and which is independent of the electrical and optical characteristics of the photosensors.

2. The apparatus of claim 1, further comprising: pattern generating and shifting means connected to said signal attenuating means for applying a sequence of predetermined sets of control signals to said signal attenuating means.

3. For use with an array of N photosensors which produce output signals in response to radiant energy incident on them, apparatus for generating and imposing a predetermined, alterable attenuation in the output of each photosensor, thereby enabling production of the same effect as if the pattern of radiant energy incident on the photosensors were modulated by the imposition of a predetermined alterable or movable spatial pattern of varying transmittance in the path of the radiant energy incident on the photosensors, said apparatus comprising:
   a. pattern generator means responsive to applied pattern generating signals for generating a predetermined ordered set of N transmittance code signals each associated with one of the photosensors, said pattern generator means being responsive to applied pattern shifting signals for altering in a predetermined manner the association of transmittance code signals with photosensors;
   b. programmer means for generating and applying pattern generating signals to said pattern generator, for generating and applying read-out signals to the photosensor array, and for generating and applying pattern shifting signals to said pattern generator means, all of the signals being generated and applied in a predetermined sequence; and c. programmable attenuator means for attenuating the outputs of the photosensors in response to the transmittance codes associated with them.

4. For use with an array of photosensors, a method for generating and imposing a predetermined alterable attenuation in the output of each photosensor, thereby enabling production of the same effect as if the pattern of radiant energy incident on the photosensors were modulated by the imposition of a given alterable or movable pattern of spatially-varying transmittance in the path of the radiant energy incident on the photosensors, said method comprising the steps of:

a. generating a predetermined ordered set of N transmittance codes corresponding to the given pattern and independent of the electrical and optical characteristics of the photosensors, each transmittance code associated with one of the photosensors;

b. reading the contents of the photosensors of the array; and c. attenuating the read contents of the photosensors in accordance with their associated transmittance codes to impose on the photosensors of the array a pattern of attenuations corresponding to the given pattern.

5. The method of claim 4 further comprising the steps of:

d. altering in a predetermined manner the transmittance codes, whereby the predetermined pattern of attenuations is altered; and e. then repeating steps (a) through (c)

6. The method of claim 4 further comprising the steps of:

d. altering in a predetermined manner the association of transmittance codes with photosensors, whereby the predetermined pattern of attenuations may be shifted or altered; and e. then repeated steps (a) through (c).

7. For use with a charge-coupled photodiode array having a photosensor portion which produces output signals in response to radiant energy incident on it, a shift register portion, and an output terminal, apparatus for generating and imposing a predetermined alterable attenuation in the output of each photosensor, thereby to produce the same effect as if the pattern of radiant energy incident on the photosensor portion were modulated by the imposition of a predetermined alterable or movable spatial pattern of varying transmittance in the path of the radiant energy incident on the photosensors, said apparatus comprising:

a. pattern generator means responsive to applied signals for generating a predetermined sequence of codes representing a predetermined sequence of transmittance values at an output terminal;

b. programmer means for generating and applying read-out signals to the photosensor portion of the photodiode array, and, in a predetermined sequence applying synchronizing signals to both the shift register portion and said pattern generator means, and applying pattern shifting signals to said pattern generator means; and c. programmable attenuator means for attenuating output signals presented at the output terminals of the shift register portion of the photodiode array in response to the output represented at the output terminal of said pattern generator means.

8. For use with an array of N photosensors which produce output signals in response to radiant energy incident on them, apparatus for electrically producing the same effect as if the pattern of radiant energy incident on the photosensors were modulated by placing a given alterable or movable pattern of spatially-varying transmittance in the path of the radiant energy incident on the photosensors, said apparatus comprising:

signal attenuating means coupled to each photosensor for attenuating the output signals of the photosensors according to a given pattern which is referenced to the relative locations of the photosensors within the array and which is independent of the electrical and optical characteristics of the photosensors;

pattern generating and shifting means coupled to said signal attenuating means for applying predetermined sets of control signals to said signal attenuating means in response to synchronizing signals; and, programmer means coupled to said pattern generating and shifting means for generating synchronizing signals and applying said synchronizing signals to said pattern generating and shifting means and to the photosensor array.

* * * * *

UNITED STATES PATENT OFFICE
CERTIFICATE OF CORRECTION

PATENT NO. : 4,013,832
DATED : 22 March 1977
INVENTOR(S) : Graham M. Douglas

It is certified that error appears in the above-identified patent and that said Letters Patent are hereby corrected as shown below:

Col. 1, line 58, after "diode," change "it" to --is--

Col. 2, line 44, after "array" change "of" to --for--

Col. 3, line 44, change "particle" to --particular--

Col. 10, line 21, (Claim 7) change "represented" to --presented--

Signed and Sealed this

Twenty-first Day of March 1978

[SEAL]

Attest:

RUTH C. MASON
Attesting Officer

LUTRELLE F. PARKER
Acting Commissioner of Patents and Trademarks